US009609266B2

United States Patent
Shimizu et al.

(10) Patent No.: US 9,609,266 B2
(45) Date of Patent: Mar. 28, 2017

(54) IMAGE RECORDING APPARATUS AND IMAGE RECORDING METHOD FOR RAPID MIRRORING RESTORATION

(71) Applicant: Panasonic Intellectual Property Management Co., Ltd., Osaka (JP)

(72) Inventors: Toshihiro Shimizu, Fukuoka (JP); Takayuki Haraguchi, Fukuoka (JP); Kenichiro Sugimoto, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 14/687,717

(22) Filed: Apr. 15, 2015

(65) Prior Publication Data

US 2015/0319401 A1  Nov. 5, 2015

(30) Foreign Application Priority Data

Apr. 30, 2014 (JP) .................................. 2014-093519

(51) Int. Cl.
*H04N 5/77* (2006.01)
*H04N 5/781* (2006.01)
*H04N 5/91* (2006.01)

(52) U.S. Cl.
CPC .............. *H04N 5/77* (2013.01); *H04N 5/781* (2013.01); *H04N 5/91* (2013.01)

(58) Field of Classification Search
CPC .. G06F 11/20; G06F 11/1666; G06F 11/2056; G06F 11/2082; H04N 5/781; H04N 5/77; H04N 5/91

USPC .......................................................... 386/326
See application file for complete search history.

(56) References Cited

U.S. PATENT DOCUMENTS

| 5,432,922 | A  | * | 7/1995  | Polyzois ............. G06F 11/1666 707/999.202 |
| 5,696,933 | A  | * | 12/1997 | Itoh ..................... G06F 11/2094 711/114 |
| 5,887,128 | A  | * | 3/1999  | Iwasa ..................... G06F 3/0601 714/6.1 |
| 5,933,834 | A  | * | 8/1999  | Aichelen ............... G06F 3/0613 348/E5.008 |
| 7,984,019 | B2 | * | 7/2011  | Boyko .............. G06F 17/30563 707/641 |
| 8,516,208 | B2 |   | 8/2013  | Kawano et al. |
| 9,197,686 | B1 | * | 11/2015 | Kirkby ................... H04L 65/60 |

(Continued)

FOREIGN PATENT DOCUMENTS

FR  2626696     *  8/1989
JP  409297718 A  * 11/1997

(Continued)

*Primary Examiner* — David Harvey
(74) *Attorney, Agent, or Firm* — Seed IP Law Group LLP

(57) ABSTRACT

An image recording apparatus includes an image recording unit which records a first image data, and a second image data which is recorded in a first recording medium in a second recording medium; an instruction unit which gives an instruction regarding writing start positions of the first image data and the second image data in the second recording medium; and a recording ending control unit which performs a control so that recording of the second image data is ended when a recording position of the first image data and a recording position of the second image data in the second recording medium match with each other.

13 Claims, 3 Drawing Sheets

(56) References Cited

U.S. PATENT DOCUMENTS

| | | | |
|---|---|---|---|
| 2004/0230742 A1* | 11/2004 | Ikeuchi | G06F 3/061 |
| | | | 711/112 |
| 2006/0064559 A1* | 3/2006 | Sampathkumar | G06F 11/2058 |
| | | | 711/162 |
| 2006/0107005 A1* | 5/2006 | Philippe Andre | G06F 11/1441 |
| | | | 711/162 |
| 2006/0294416 A1* | 12/2006 | Tsai | G06F 11/1076 |
| | | | 714/6.2 |
| 2008/0013926 A1* | 1/2008 | Yamada | G11B 20/1883 |
| | | | 386/248 |
| 2010/0205482 A1* | 8/2010 | Kaneko | G06F 11/2087 |
| | | | 714/6.12 |
| 2010/0241806 A1 | 9/2010 | Kawano et al. | |
| 2014/0089730 A1* | 3/2014 | Watanabe | G06F 11/2094 |
| | | | 714/6.22 |

FOREIGN PATENT DOCUMENTS

| | | |
|---|---|---|
| JP | 4691602 B2 | 6/2011 |
| JP | 2012-103873 A | 5/2012 |

* cited by examiner

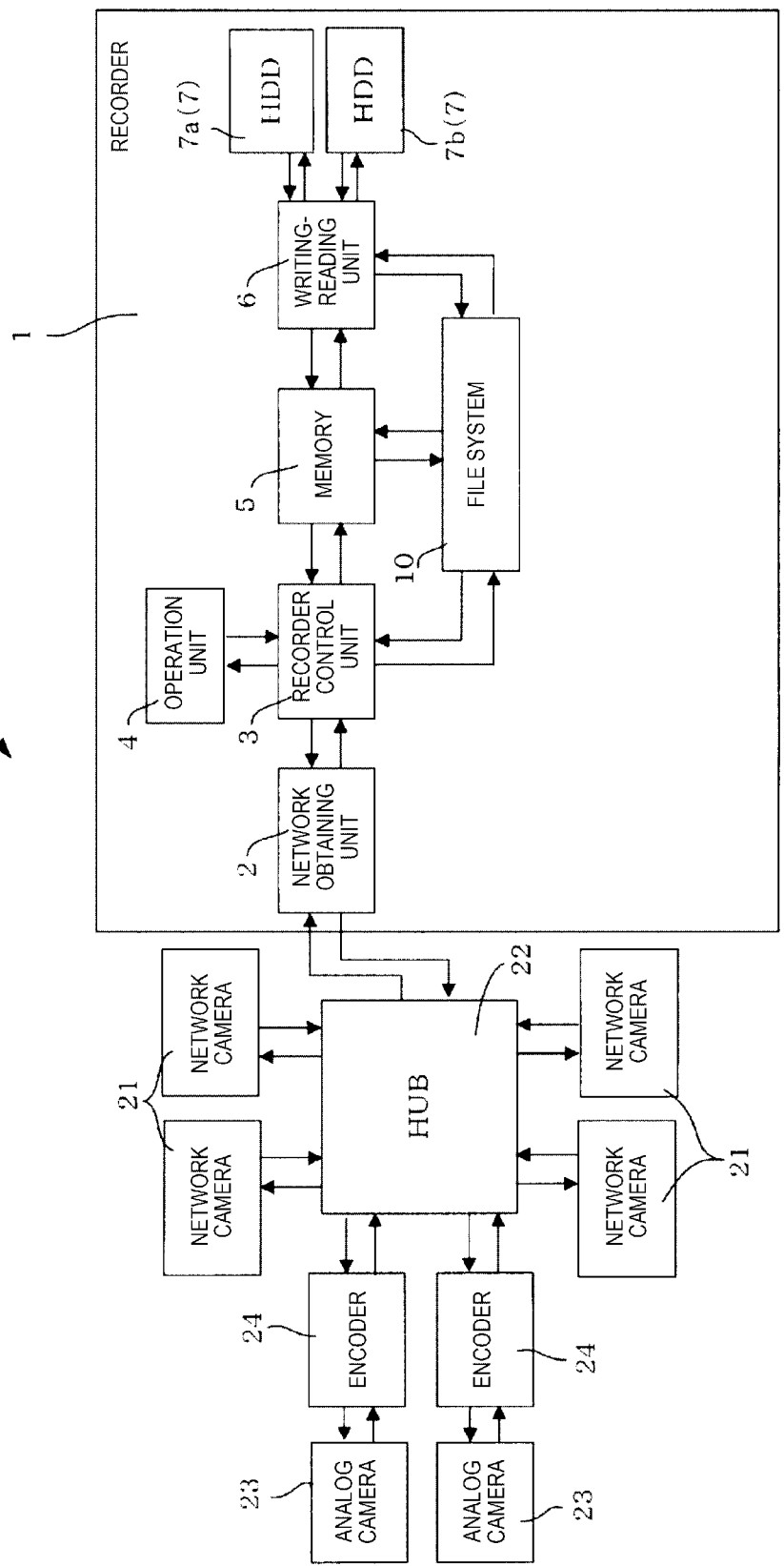

IMAGE RECORDING APPARATUS AND IMAGE RECORDING METHOD FOR RAPID MIRRORING RESTORATION

BACKGROUND OF THE INVENTION

1. Field of the Invention

The present invention relates to an image recording apparatus and an image recording method, and in particular, relates to an image recording apparatus and an image recording method in which mirroring restoration can be performed rapidly.

2. Description of the Related Art

In the related art, a mirroring technology in which a plurality of HDDs are included in order to protect data which is recorded in a hard disk drive (HDD), and data is recorded with respect to the plurality of HDDs at the same time, and is backed up.

In PTL 1, an image processing device includes a plurality of HDDs which store the same data with each other using mirroring. The image processing device transmits data stored in an HDD which is being normally operated to a new HDD when exchanging an HDD with a new HDD. The image processing device calculates a copying time in the entire region which is necessary when performing data transmission from an HDD to a new HDD using copying in the entire region, and calculates a total backup time which is necessary when performing data transmission using backup from an HDD to a new HDD using an external storage medium. The image processing device compares the copying time for the entire region to the total backup time, determines which one of the data transmission using copying in the entire region and the data transmission using backup is fast, and performs mirroring restoration using a method which is determined to be fast.

In Japanese Patent Unexamined Publication No. 2012-103873, when mirroring restoration is performed (mirroring restoration), the entire image data of an HDD which is being normally operated is transmitted to a new HDD. For this reason, it takes a long time when performing mirroring restoration.

SUMMARY OF THE INVENTION

The present invention provides an image recording apparatus and an image recording method in which mirroring restoration can be performed rapidly.

An image recording apparatus according to an embodiment of the present invention includes an image obtaining unit which obtains a first image data; an image recording unit which records the first image data, and second image data which is recorded in a first recording medium in a second recording medium; an instruction unit which gives an instruction regarding writing start positions of the first image data and the second image data in the second recording medium; a recording direction control unit which controls the first image data so as to be recorded in the second recording medium from the writing start position toward a first direction, and controls the second image data so as to be recorded in the second recording medium from the writing start position toward a second direction which is opposite to the first direction; and a recording ending control unit which performs a control so that recording of the second image data is ended when a recording position of the first image data and a recording position of the second image data in the second recording medium match with each other.

An image recording method according to another embodiment of the present invention is an image recording method in an image recording apparatus, the method including obtaining first image data; giving an instruction regarding writing start positions of the first image data, and second image data which is recorded in a first recording medium, in a second recording medium; performing a control so that the first image data is recorded in the second recording medium from the writing start position toward a first direction; performing a control so that the second image data is recorded in the second recording medium from the writing start position toward a second direction which is opposite to the first direction; and performing a control so that recording of the second image data is ended when a recording position of the first image data and a recording position of the second image data in the second recording medium match with each other.

According to the embodiment of the present invention, it is possible to perform mirroring restoration rapidly.

BRIEF DESCRIPTION OF DRAWINGS

FIG. 1 is a block diagram of an image recording system according to an embodiment;

DETAILED DESCRIPTION OF THE PREFERRED EMBODIMENT

Figure 2A:
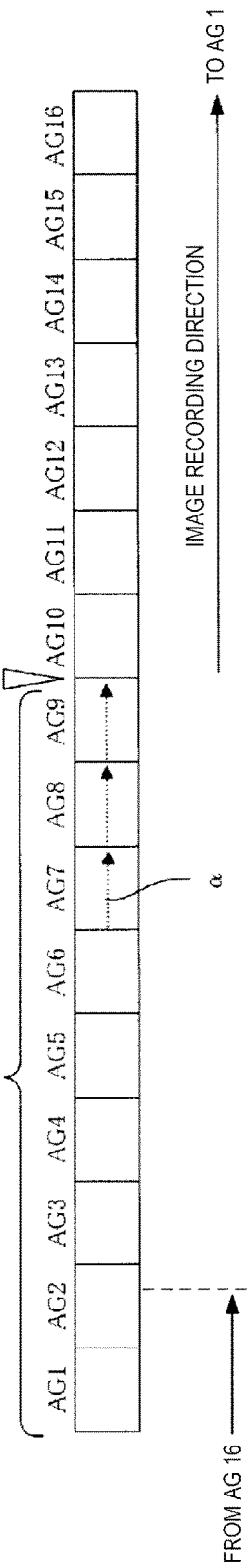
FIG. 2A is a schematic diagram which illustrates an example of writing in a first hard disk drive (HDD), and a direction of reading from the first HDD according to the embodiment.

Hereinafter, an embodiment of the present invention will be described using drawings.

FIG. 1 is a block diagram which illustrates a configuration example of image recording system 100 according to the embodiment of the present invention. Image recording system 100 includes recorder 1, network camera 21, HUB 22, analog camera 23, and encoder 24. Recorder 1 is an example of an image recording apparatus.

Recorder 1, network camera 21, and encoder 24 are connected through a network (for example, the Internet, local area network (LAN)), for example. Any one of network camera 21, or analog camera 23 and encoder 24 may not be provided, and may be omitted.

Recorder 1 includes network obtaining unit 2, recorder control unit 3, operation unit 4, memory 5, writing-reading unit 6, and file system 10. In recorder 1, one or more HDDs 7 are inserted into an HDD slot (not illustrated).

Network obtaining unit 2 controls a network communication, includes a circuit in which a signal which is communicated between devices on the network and network obtaining unit 2 is processed, and performs encoding processing and decoding processing of communication data. Network obtaining unit 2 receives, for example, image data which is captured using network camera 21 or analog camera 23 through a network. The captured image data may be obtained through a predetermined recording medium, for example, in addition to the configuration of receiving image data through a network. Network obtaining unit 2 may obtain sound data along with image data. Network obtaining unit 2 is an example of the image obtaining unit.

Recorder control unit 3 includes a central processing unit (CPU), and control the entire recorder 1. Recorder control unit 3 performs a control related to a control and image recording regarding restoring of HDD 7 (mirroring restoration), by executing a program which is stored in memory 5 using the CPU, for example.

When HDD 7 is normal, for example, recorder control unit 3 performs a control so that image data (examples of image recording data and first image data) which is received using network obtaining unit 2 is recorded in HDDs 7a and 7b using mirroring. In this manner, it is possible to improve reliability of holding image data. That is, in recorder 1, as a recording method, mirroring in which HDD 7a (first HDD) and HDD 7b (second HDD) overlappingly record the same image data is adopted.

Meanwhile, when any one of HDD 7 in HDDs 7 is abnormal, and it is not possible to record image data in abnormal HDD 7, recorder control unit 3 exchanges abnormal HDD 7 with new HDD 7, and performs a control so that mirroring restoration is performed. In the mirroring restoration, recorder control unit 3 performs a control so that image data (examples of restored data and second image data) is recorded from HDD 7 which is being normally operated in HDD 7 which is exchanged with abnormal HDD 7. In this manner, it is possible to restore data which is not subjected to mirroring during the abnormal period, and to improve reliability of holding image data.

Operation unit 4 receives various operations from a user. Operation unit 4 gives, for example, an instruction of executing mirroring, and an instruction of starting mirroring restoration.

Memory 5 includes, for example, a Random Access Memory (RAM), or a Read Only Memory (ROM). In memory 5, various information and various programs are recorded. Memory 5 temporarily holds, for example, data to be written in HDD 7 (for example, image data and sound data), and data to be read from HDD 7 (for example, image data and sound data).

Writing-reading unit 6 performs writing processing and reading processing of data (for example, image data and sound data) with respect to HDD 7 based on instruction from file system 10, for example. Writing-reading unit 6 records image data which is received using network obtaining unit 2, or image data which is recorded in any one of HDDs 7 (for example, HDD 7a) in another HDD 7 (for example, HDD 7b). Writing-reading unit 6 records image data with respect to HDD 7a and HDD 7b, for example, in a predetermined recording region (for example, Allocation Group (AG), refer to FIGS. 2A and 2B), and at a position of a predetermined writing address. AG is a recording region which is obtained by physically dividing HDD 7. Recorder control unit 3 and writing-reading unit 6 function as an image recording unit.

In HDD 7, various data (for example, image data and sound data) are recorded. In FIG. 1, HDD 7 is exemplified as a recording medium; however, it may be a recording medium (for example, solid state drive (SSD), and secure digital (SD) memory card) other than the HDD 7. HDD 7 is divided into a plurality of recording regions (for example, AG), for example. In FIG. 1, two HDDs of 7a and 7b are illustrated; however, three or more HDDs 7 may be provided. Each HDD 7 can be independently operated, and can be detachably attached to recorder 1.

In order to simplify descriptions, a case in which HDD 7a is normally operated, HDD 7b is abnormal, and HDD 7b is exchanged by a user will be mainly exemplified. That is, image recording data is written in HDD 7a, and restoration data is read from HDD 7a. Image recording data and restoration data are written in HDD 7b after being exchanged. It may be a configuration in which HDD 7a is abnormal, and HDD 7b is normally operated.

File system 10 includes, for example, a file allocation table (FAT) in which position information of a file which is an assembly of data recorded in HDD 7 is recorded.

File system 10 manages a configuration of HDD 7, a sector, or recording, for example. File system 10 manages, for example, a writing position of image data, and information of a reading position. File system 10 manages writing direction, and reading direction of image data, for example.

When there is an instruction of starting mirroring restoration, for example, file system 10 gives an instruction on a starting position of writing of image recording data and restoration data (for example, sector of writing target, recording region of writing target, and address of writing target) in HDD 7b.

Figure 2B:
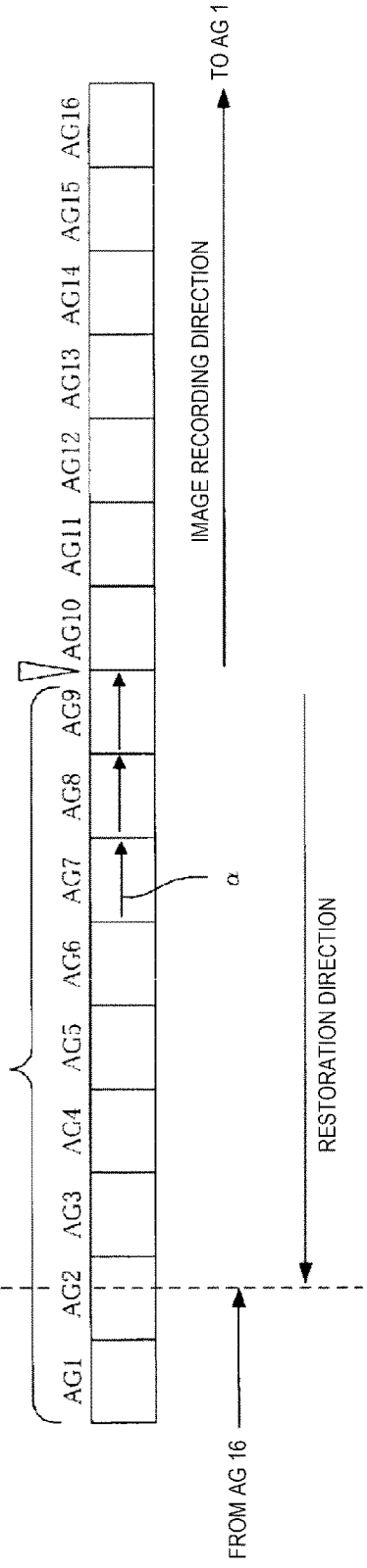
FIG. 2B is a schematic diagram which illustrates an example of writing direction with respect to a second HDD according to the embodiment.

File system 10 controls, for example, image recording data to be recorded in HDD 7b from the writing start position toward the image recording direction (an example of first direction) (refer to FIGS. 2A and 2B).

File system 10 controls, for example, restoration data so as to be recorded in HDD 7b from the writing start position toward the restoration direction (an example of second direction) which is opposite to the image recording direction.

Accordingly, file system 10 moves a recording region (for example, AG) in HDD 7b in which image recording data is recorded toward the image recording direction, and moves a recording region in HDD 7b in which restoration data is recorded toward the restoration direction.

File system 10 performs a control so that recording of the restoration data is ended when a recording position (image recording position) in which image recording data is recorded, and a recording position (restoration position) in which restoration data is recorded in HDD 7b match with each other, for example. The recording position includes, for example, a sector of a recording target, a recording region of the recording target (for example, AG), or an address of the recording target.

In this case, for example, when a recording region (for example, AG) in which image recording data is recorded, and a recording region (for example, AG) in which restoration data is recorded in HDD 7b match with each other, file system 10 may record image data up to a terminal end of the matched recording region. Recording of the restoration data may be controlled so as to end, after recording the image data up to the terminal end of the matched recording region. File system 10 may perform a control so that recording of restoration data is ended at a point of time in which an image recording position and a restoration position match with each other in HDD 7b, for example. File system 10 may perform a control so that recording of restoration data is ended at a point of time in which a recording region in which image recording data is recorded in HDD 7b, and a recording region in which the restoration data is recorded match with each other.

Accordingly, file system 10 functions as an instruction unit, a recording direction control unit, and a recording ending control unit.

Network camera 21 captures an image in a predetermined area, and sends the captured image data to HUB 22. One or more network cameras 21 are provided. Network camera 21 may collect sound, and may output sound data.

HUB 22 integrates network cables which are connected to each device.

Analog camera 23 captures, for example, an image in a predetermined area, and sends analog data as captured image data to encoder 24. Analog camera 23 and encoder 24 are connected using, for example, a coaxial cable or a network. Analog camera 23 may collect sound, and may output sound data.

Encoder 24 obtains analog data (including image data) from analog camera 23, performs encoding with respect to the analog data using a predetermined encoding method, and sends digital data which is encoded to HUB 22. The encoding method using encoder 24 includes, for example, H264, a Moving Picture Experts Group (MPEG)-4, and a Joint Photographic Experts Group (JPEG).

When network camera 21 and analog camera 23 capture an image, image data of the captured image is integrated using HUB 22, is sent to recorder 1 through a network, and is subjected to image recording in HDD 7. The recorded image data may be displayed by being delivered to a monitoring personal computer (PC) (not illustrated), for example.

Subsequently, an operation example using image recording system 100 will be described.

FIGS. 2A and 2B are schematic diagrams which illustrate recording examples of image recording data and restoration data.

Figure 3:
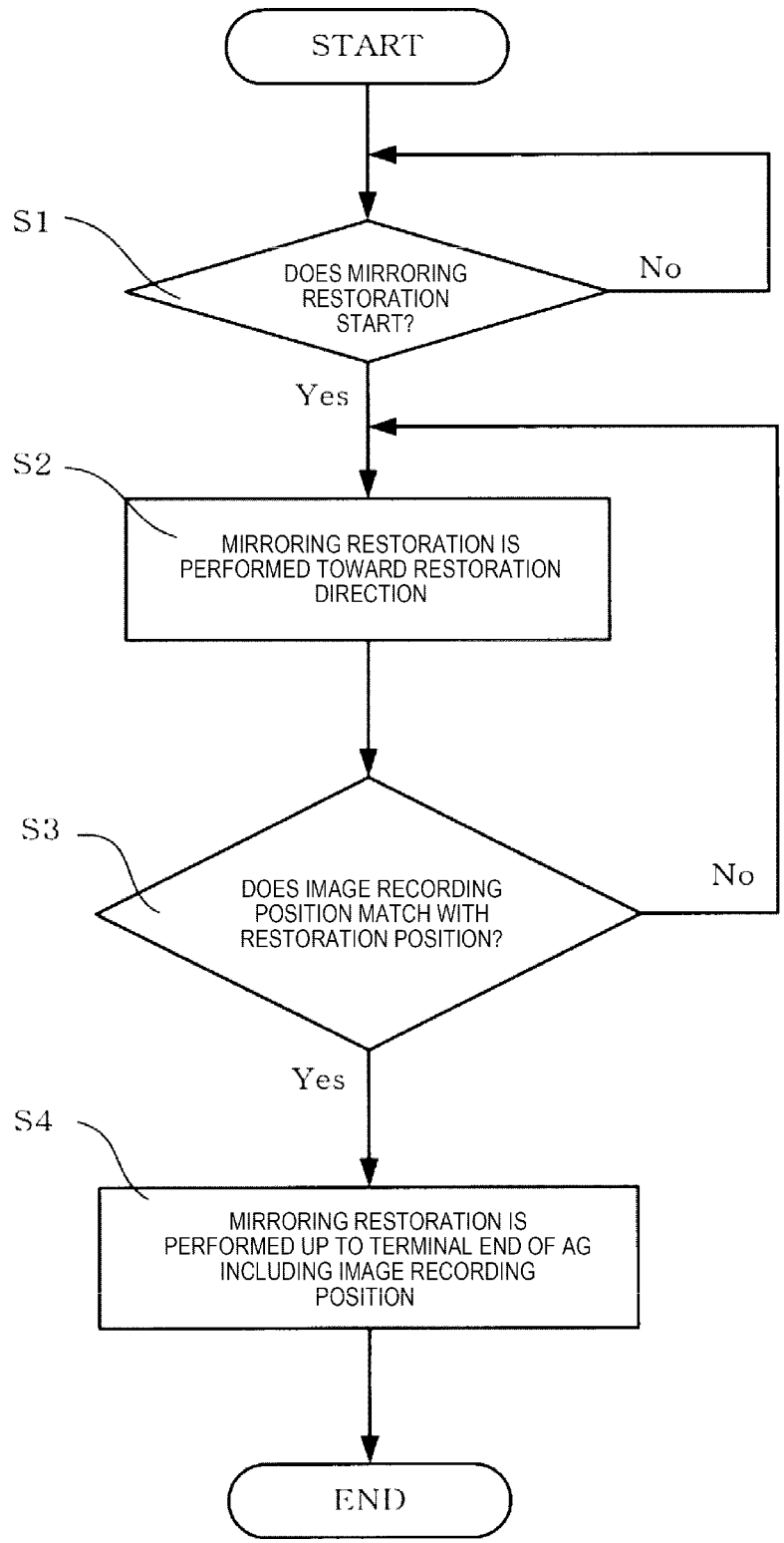
FIG. 3 is a flowchart which illustrates an outline of an operation example of the image recording apparatus according to the embodiment.

FIG. 3 is a flowchart which illustrates an operation example of recorder 1. FIGS. 2A, 2B, and 3 exemplify a state in which HDD 7b is abnormal; however, the same is applied to a case in which HDD 7a is abnormal.

FIG. 2A illustrates an example of writing image recording data and reading restoration data in HDD 7a. FIG. 2B illustrates an example of writing image recording data and restoration data in HDD 7b.

In FIGS. 2A and 2B, HDD 7 includes a plurality of allocation groups (AG). In FIG. 2, HDD 7 is divided into sixteen AGs. File system 10 manages HDD 7, for example, in every AG (in AG unit). In FIG. 2, the AG divided into sixteen AGs is denoted by AG1, AG2, ..., AG16 from the left side. The AG1 is located on the beginning end side of HDD 7, and the AG16 is located on the terminal end side of HDD 7.

Recorder 1 executes mirroring when HDD 7 is normal.

In this case, network obtaining unit 2 receives image recording data from network camera 21 or analog camera 23. Recorder control unit 3 confirms whether or not there is image data received by network obtaining unit 2 using polling with respect to network obtaining unit 2. When there is image data received by network obtaining unit 2, recorder control unit 3 writes the image data (image recording data) in memory 5. Recorder control unit 3 informs file system 10 that the image recording data is written in memory 5.

File system 10 controls writing-reading unit 6 so as to write the image recording data which is held in memory 5 at each of image recording positions of HDDs 7a and 7b. Writing-reading unit 6 writes the image recording data which is held in memory 5 in addresses of HDDs 7a and 7b which are designated by file system 10.

In this case, writing-reading unit 6 starts writing of image recording data from the beginning end of the AG10 based on the writing start position, as illustrated in FIGS. 2A and 2B, for example. Writing-reading unit 6 records image recording data in HDDs 7a and 7b in ascending order of numbers of the AG (that is, AG10→AG11→AG12, etc.). Directions of the ascending order of numbers of the AG are image recording directions which are illustrated in FIGS. 2A and 2B. File system 10 controls the image recording direction.

In the middle of a recording operation of image recording data, operations from a reception to writing of the above described image recording data are repeated. When the image recording data is written up to the terminal end of HDDs 7a and 7b, writing of the image recording data is continued from the beginning end of HDDs 7a and 7b (refer to FIGS. 2A and 2B). That is, in FIGS. 2A and 2B, image recording data is recorded in the subsequent AG1 of the AG16. In HDDs 7a and 7b, when image data is recorded in AG as a writing target in advance, the image recording data is recorded in an overwriting manner.

Recording of image recording data is performed while executing mirroring or mirroring restoration, for example. Recording of image recording data may be performed based on a starting operation and an ending operation using the operation unit 4, for example. Recording of image recording data may be performed at a predetermined point of time using a timer (not illustrated) which is included in recorder control unit 3, for example.

For example, when HDD 7b becomes abnormal, and cannot be used, recorder control unit 3 presents warning information denoting an occurrence of abnormality in HDD 7b, or which prompts exchanging of HDD 7b, for example, to a presentation unit (not illustrated). The presentation of warning information includes, for example, a display (for example, lighting of light emitting diode (LED), or display on monitor), a sound output, or a presentation using vibration. A user who recognized an occurrence of abnormality replaces abnormal HDD 7b with new HDD 7b, and inserts new HDD 7b into a slot (not illustrated) of recorder 1.

Even in the middle of exchanging HDD 7b, imaging using network camera 21 or analog camera 23 is continued, and image recording data is continuously recorded in HDD 7a. When exchanging of HDD 7b is completed, a user gives an instruction of starting mirroring restoration through operation unit 4. In this case, operation unit 4 receives the instruction of starting mirroring restoration, and informs recorder control unit 3 of the instruction of starting mirroring restoration.

Recorder control unit 3 determines whether or not the instruction of starting mirroring restoration from operation unit 4 is detected (S1). Recorder control unit 3 may detect the instruction of starting mirroring restoration when it is detected that new HDD 7b is inserted into recorder 1. Recorder control unit 3 informs file system 10 of starting of mirroring restoration.

When starting of mirroring restoration is informed, file system 10 gives an instruction regarding a reading start position and a writing start position for starting the mirroring restoration. In FIGS. 2A and 2B, the beginning end (left end) of the recording region AG10 denotes the reading start position and the writing start position (refer to "V"). The reading start position and the writing start position are the same position.

File system 10 controls writing-reading unit 6 so that restoration data is read from the reading start position of HDD 7a (origin of restoration) toward the beginning end of HDD 7a. Accordingly, a direction in which reading of restoration data is proceeding (restoration direction) in HDD 7a is a direction opposite to the direction in which writing of image recording data is proceeding in HDD 7a (image recording direction).

In FIG. 2B, writing-reading unit 6 starts reading of image data (restoration data) recorded in HDD 7a from the beginning end of AG9 in HDD 7a. Writing-reading unit 6 reads restoration data from HDD 7a in descending order of AG (that is, AG9→AG8→AG7). The direction of the descending order of numbers of AG is the restoration direction. File system 10 controls the restoration direction. In AG, restoration data is read from the beginning end toward the terminal end of AG from HDD 7a. Writing-reading unit 6 reads restoration data which is recorded in HDD 7a from an address which is designated by file system 10, and writes the data in memory 5 (refer to direction of arrow α in FIG. 2B).

File system 10 controls writing-reading unit 6 so that restoration data which is held in memory 5 is written in a writing address which is the same as a reading address of HDD 7b (destination of restoration). That is, file system 10 performs a control so that a reading address of HDD 7a and a writing address of HDD 7b match with each other.

In FIG. 2B, writing-reading unit 6 starts to write image data (restoration data) recorded in HDD 7a from the beginning end of AG9 of HDD 7b. Writing-reading unit 6 writes image recording data in HDD 7b in descending order (that is, AG9→AG8→AG7) of numbers of AG. That is, writing-reading unit 6 writes restoration data which is held in memory 5 in an address of HDD 7b which is designated by file system 10 corresponding to a reading position of HDD 7a. In AG, restoration data is written in HDD 7b from the beginning end to the terminal end of AG (refer to direction of arrow α in FIG. 2B).

In this manner, writing-reading unit 6 records restoration data in HDD 7b toward a restoration direction which is opposite to the image recording direction (S2). The recording direction of the restoration data is controlled by file system 10.

During the mirroring restoration, image recording data is recorded along with restoration data with respect to exchanged HDD 7b. That is, recorder 1 performs parallel processing in which the restoration data and the image recording data are recorded in HDD 7b at the same time.

In the parallel processing, recording of the image recording data is prior to recording of the restoration data. Recording of the image recording data proceeds in the image recording direction, and recording of the restoration data proceeds in the restoration direction. For this reason, when parallel processing is continued, a recording position and a restoration position match with each other in HDD 7b at a predetermined timing. In FIG. 2, a recording address as the recording position, and a restoration address as the restoration position match with each other in AG2.

File system 10 determines whether or not the recording position and the restoration position match with each other (S3). When the recording position and the restoration position do not match with each other, mirroring restoration is continued, and recording of the restoration data is continued. That is, recorder 1 repeats reading of restoration data from HDD 7a, and writing of restoration data in HDD 7b until the recording position and the restoration position match with each other.

When the recording position and the restoration position match with each other, writing-reading unit 6 records restoration data up to the terminal end of AG including the recording position and the restoration position (S4). After the processing in S4, mirroring restoration is ended.

It is exemplified in FIG. 3 that file system 10 controls restoration data so as to be recorded up to the terminal end of AG including the recording position and the restoration position, when the recording position and the restoration position match with each other. File system 10 may end recording of restoration data at a point of time in which the recording position and the restoration position match with each other without being limited to this.

It is exemplified in S3 that file system 10 determines whether or not the recording address as the recording position and the restoration address as the restoration position match with each other; however, whether or not Ag as a recording target and AG as a restoration target match with each other may be determined. By determining matching in a unit of AG, it is possible to relieve a load when performing a determination in file system 10.

Subsequently, a time which is necessary when performing mirroring restoration in the related art, and a time which is necessary when performing mirroring restoration using recorder 1 will be compared with each other. The image processing device which is disclosed in PTL 1 does not perform image recording; however, it is assumed that image recording is performed in the following comparison examples 1 and 2. It is assumed that an image recording direction and a restoration direction are the same. It is assumed that recording of restoration data up to a terminal end of a recording medium is continued even if an image recording position catches up with a restoration position.

In the comparison example 1, a capacity of a recording medium is set to 500 GB, an image recording speed is set to 16 MB/sec (4 Mbit×32), and a restoration speed is set to 8 MB/sec. In the comparison example 1, a time which is necessary for mirroring restoration is 500 GB/8 MB/sec=1041.667 minutes when using the related art; however, it is improved to 500 GB/(16 MB/sec+8 MB/sec) =347.2222 minutes when using the embodiment.

In the comparison example 2, a capacity of a recording medium is set to 500 GB, a recording speed is set to 16 MB/sec (4 Mbit×32), and a restoration speed is set to 4 MB/sec. In the comparison example 2, a time which is necessary for mirroring restoration is 500 GB/4 MB/sec=2083.333 minutes when using the related art; however, it is improved to 500 GB (16 MB/sec+4 MB/sec) =416.6667 minutes when using the embodiment.

The recording speed and the restoration speed are variable. When a load of recorder 1 is high due to a reproduction of image data, or the like, there is a case in which the recording speed and the restoration speed become slower than the values denoted in the comparison examples 1 and 2; however, there is no change that the recording speed is higher than the restoration speed.

According to recorder 1, when a recording position of recording data and a recording position of restoration data match with each other during recording of restoration data, it is possible to reduce a time necessary for mirroring restoration by ending mirroring restoration in HDD 7b. It is not necessary to record restoration data from a beginning end to a terminal end in HDD 7b, and it is possible to suppress overlapping of image recording data with the restoration data, and to reduce unnecessary restoration. When the image recording data and the restoration data are recorded in a unit of AG, it is easy to manage image recording and restoration in file system 10.

Recorder 1 can record restoration data which is recorded in the HDD 7a in advance, and image recording data which is obtained from HUB 22 in HDD 7b at the same time, and can perform parallel processing of restoration and image recording of image data. When recording of the restoration data is ended at a point of time in which an image recording position and a restoration position match with each other, there is no waste when recording the restoration data, and it is possible to further reduce a restoration time.

The present invention is not limited to the configuration of the above described embodiment, and can be applied to any configuration in which a function denoted in claims, or a function in the configuration of the embodiment can be achieved.

For example, in the above described embodiment, a case in which a recording region of HDD 7 is divided in each AG has been exemplified; however, there is no limitation to this, and HDD 7 may not be divided in each recording region. In this case, for example, restoration data may be continuously recorded from a writing start position toward a restoration direction of HDD 7b. That is, restoration data may be simply recorded from the writing start position toward the restoration direction.

For example, in the above described embodiment, a case in which recorder 1 and each camera are independently provided has been exemplified; however, recorder 1 may include a portion related to each camera and camera processing (for example, encoder 24).

According to the embodiment, since mirroring restoration in the second recording medium is ended when a recording position of the first image data and a recording position of the second image data match with each other during recording of the first image data, it is possible to reduce a recording amount of the second image data which is written in the second recording medium from the first recording medium. Accordingly, it is possible to reduce a time necessary for recording (mirroring restoration) of the second image data. It is not necessary to record the second image data from a beginning end to a terminal end in the second recording medium, and it is possible to suppress overlapping of recording of the first image data with the second image data. Accordingly, it is possible to rapidly perform mirroring restoration.

According to the embodiment, since the first image data and the second image data are recorded in a unit of recording range of a predetermined size, it is possible to easily manage recording of the first image data and the second image data in the image recording apparatus. According to the embodiment, it is possible to easily manage recording of the first image data and the second image data in the image recording apparatus, and to reduce omission of a record of the second image data with respect to the second recording medium. Accordingly, it is possible to easily improve an accuracy of mirroring restoration.

According to the embodiment, it is possible to perform mirroring restoration while performing image recording of a real time image which is imaged using an imaging apparatus, for example, and accordingly, it is possible to perform parallel processing.

What is claimed is:

1. An image recording apparatus comprising:
    an image input which, in operation, receives first image data;
    an image recorder which, in operation, records the first image data received via the image input, and second image data recorded in a first recording medium, in a second recording medium; and
    a file system controller which, in operation,
        sets writing start positions of the first image data and the second image data in the second recording medium;
        controls cyclic recording of the first image data in the second recording medium from the writing start position in a first direction, and cyclic recording of the second image data in the second recording medium from the writing start position in a second direction opposite from the first direction; and
        controls ending recording of the second image data in the second direction in response to a recording position of the first image data meeting a recording position of the second image data in the second recording medium.

2. The image recording apparatus according to claim 1, wherein the first recording medium and the second recording medium record image data in units of recording regions, and
    wherein the file system controller, in operation,
        controls recording of the first image data in recording regions of the second recording medium sequentially in the first direction, and recording of the second image data in recording regions of the second recording medium sequentially in the second direction, and
        controls ending recording of the second image data in the second direction in response to the recording region in which the first image data is recorded coinciding with the recording region in which the second image data is recorded in the second recording medium.

3. The image recording apparatus according to claim 2, wherein, in response to the recording region in which the first image data is recorded coinciding with the recording region in which the second image data is recorded in the second recording medium, the file system controller ends recording of the second image data after recording the second image data up to a terminal end of the coinciding recording region.

4. The image recording apparatus according to claim 1, wherein the image input receives the first image data captured by a camera.

5. An image recording method implemented in an image recording apparatus comprising:
    receiving first image data;
    setting writing start positions of the received first image data, and second image data recorded in a first recording medium, in a second recording medium;
    cyclically recording the first image data in the second recording medium from the writing start position in a first direction;
    cyclically recording the second image data in the second recording medium from the writing start position in a second direction opposite from the first direction; and
    ending recording of the second image data in the second direction in response to a recording position of the first image data meeting a recording position of the second image data in the second recording medium.

6. The imaging recording method according to claim 5, comprising:
    recording the first image data in recording regions of the second recording medium sequentially in the first direction;
    recording the second image data in recording regions of the second recording medium sequentially in the second direction; and
    ending recording of the second image data in the second direction in response to the recording region in which the first image data is recorded coinciding with the recording region in which the second image data is recorded in the second recording medium.

7. The imaging recording method according to claim 6, comprising:
    in response to the recording region in which the first image data is recorded coinciding with the recording region in which the second image data is recorded in the second recording medium, ending recording of the second image data after recording the second image data up to a terminal end of the coinciding recording region.

8. The imaging recording method according to claim 6, comprising:
recording the second image data in each recording region in the first direction.

9. The imaging recording method according to claim 5, comprising:
setting the writing start positions of the first image data and the second image data at the same position in the second recording medium.

10. The image recording apparatus according to claim 1, wherein the file system controller sets the writing start positions of the first image data and the second image data at the same position in the second recording medium.

11. The image recording apparatus according to claim 1, wherein the first and second recording media are selected from a group consisting of hard disk drives, solid state drives, and secure digital memory cards.

12. The image recording apparatus according to claim 1, wherein the file system controller controls the cyclic recording of the first image data from a second terminal end of the second recording medium after recording the first image data up to a first terminal end of the second recording medium, and the cyclic recording of the second image data from the first terminal end of the second recording medium after recording the second image data up to the second terminal end of the second recording medium.

13. The image recording apparatus according to claim 2, wherein the file system controller controls recording of the second image data in each recording region in the first direction.

* * * * *